United States Patent
Min

(10) Patent No.: US 10,259,502 B1
(45) Date of Patent: Apr. 16, 2019

(54) MOUNTING UNIT FOR REAR SUSPENSION

(71) Applicants: Hyundai Motor Company, Seoul (KR); Kia Motors Corporation, Seoul (KR)

(72) Inventor: Huensick Min, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 2 days.

(21) Appl. No.: 15/822,256

(22) Filed: Nov. 27, 2017

(30) Foreign Application Priority Data

Oct. 12, 2017 (KR) .......................... 10-2017-0132794

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC ....... B62D 21/11; B62D 21/155; B62D 25/20
USPC ............................... 296/187.08, 193.07, 204
See application file for complete search history.

(56) References Cited

U.S. PATENT DOCUMENTS

| 6,349,953 B1* | 2/2002 | Yoshihira | B60G 7/02 280/124.109 |
| 2005/0248185 A1* | 11/2005 | Hayashi | B62D 24/02 296/193.07 |
| 2007/0228775 A1* | 10/2007 | Godfrey | B62D 21/155 296/187.08 |
| 2010/0072787 A1* | 3/2010 | Abe | B62D 21/11 296/203.04 |
| 2012/0187724 A1* | 7/2012 | Tomozawa | B62D 21/11 296/193.09 |
| 2013/0049393 A1* | 2/2013 | Kurogi | B62D 21/11 296/30 |
| 2014/0151991 A1* | 6/2014 | Kim | B62D 25/082 280/785 |
| 2017/0225718 A1* | 8/2017 | Narahara | B62D 27/04 |

* cited by examiner

*Primary Examiner* — Gregory A Blankenship
(74) *Attorney, Agent, or Firm* — Mintz Levin Cohn Ferris Glovsky and Popeo, P.C.; Peter F. Corless

(57) ABSTRACT

A mounting unit for a rear suspension is provided. The mounting unit for a rear suspension of a multi link type coupling a rear suspension member to a rear floor side member includes a pipe nut disposed through one side of the rear floor side member and first and second brackets that couple to upper and lower end portions of the pipe nut to the rear floor side member and a rear cross member, respectively. A mounting bolt is coupled to the pipe nut to maintain the position of one side of the rear suspension member to the rear floor side member, and a support bracket is coupled to the rear floor side member and the rear cross member with the first and second brackets through a flange and disposed between an exterior lateral surface of the rear floor side member and a bottom surface of the rear cross member.

7 Claims, 5 Drawing Sheets

MOUNTING UNIT FOR REAR SUSPENSION

CROSS-REFERENCE TO RELATED APPLICATION

This application claims priority to and the benefit of Korean Patent Application No. 10-2017-0132794 filed on Oct. 12, 2017, the entire contents of which are incorporated herein by reference.

BACKGROUND

(a) Field of the Disclosure

The present disclosure relates to a mounting unit for a rear suspension, and more particularly, to a mounting unit for a rear suspension that improves lateral stiffness of a vehicle.

(b) Description of the Related Art

Generally, a suspension device of a vehicle prevents vibration and impact that are continuously generated from a road from being transmitted to a frame through a wheel and an axle during operation of the vehicle. The suspension device provides an improved comfort for a passenger and prevents a vehicle body from being damaged by excessive impact to suppress irregular vibration of the wheel and enhances driving safety. A rear suspension positioned at a rear portion of a vehicle is coupled to a vehicle body by a mounting unit including a pipe nut disposed through one side of a rear floor side member and a mounting bolt coupled with the pipe nut to couple a rear suspension member to the rear floor side member. In particular, the mounting bolt is disposed in an interior portion and a lower portion of the rear floor side member through a bracket.

However, in the mounting unit for a rear suspension according to the prior art, a lateral force of a rear wheel tire as load concentrates on the mounting bolt during vehicle cornering. Accordingly, local deformation occurs in cavities between the rear floor side member, a rear cross member, and the mounting unit. As a result, a mounting unit for a rear suspension according to the prior art has low resistance with respect to lateral deformation over a rear part of a vehicle which reduces the safety of the vehicle.

The above information disclosed in this section is merely for enhancement of understanding of the background of the disclosure and therefore it may contain information that does not form the prior art that is already known in this country to a person of ordinary skill in the art.

SUMMARY

The present disclosure provides a mounting unit for a rear suspension that disposes a support bracket between a rear floor side member and a rear cross member to improve structural stiffness. Accordingly, the vehicle resistance with respect to lateral deformation of the rear cross member may be enhanced during vehicle cornering to improve vehicle safety.

In an aspect of an exemplary embodiment of the present disclosure a mounting unit for a rear suspension of a multi link type for coupling a rear suspension member to a rear floor side member may include a pipe nut disposed through one side of the rear floor side member, a first bracket and a second bracket coupled to upper and lower end portions of the pipe nut to the rear floor side member and a rear cross member, respectively, a mounting bolt coupled to the pipe nut to couple one side of the rear suspension member to the rear floor side member, and a support bracket coupled to the rear floor side member and the rear cross member with the first and second brackets through a flange integrally formed along a perimeter, while being disposed between an exterior lateral surface of the rear floor side member and a bottom surface of the rear cross member to correspond to an end of each of the first and second brackets in an inward direction of a vehicle body.

In some exemplary embodiments, the mounting unit may further include a reinforcement plate with the pipe nut disposed therethrough while being interposed between the rear floor side member and the first bracket. The reinforcement plate may be press-molded to overlap with a predetermined section of an interior portion of the rear floor side member in a length direction with a shape that corresponds to a bottom surface and opposite interior lateral surfaces of the rear floor side member.

The support bracket may include a body portion with an intermediate portion formed to be convex, a first flange coupled to the first bracket while being formed along a predetermined section of a perimeter of the body portion and contacts an exterior lateral surface of the rear floor side member, a second flange formed along a predetermined section of a perimeter of the body portion and coupled to an interior lateral surface of one side of the rear cross member, and a third flange coupled to the second bracket while being formed along a predetermined section of a perimeter of the body portion and contacts the bottom surface of the rear cross member.

Additionally, the support bracket may include a closed cavity portion formed between the body portion, the rear floor side member, and the rear cross member. The support bracket may include an upper surface, a height that corresponds to a height of an upper surface of the first bracket. The support bracket and the second bracket may be coupled to opposite surfaces of the rear cross member, respectively, to match a boundary line between the body portion and the third flange of the support bracket with a boundary line of a flange coupled to the second bracket.

An exemplary embodiment of the present disclosure may apply a support bracket between a rear floor side member and a rear cross member to improve structural stiffness and may enhance resistance with respect to lateral deformation of the rear cross member during vehicle cornering to provide improved safety. In other words, according to an exemplary embodiment of the present disclosure, the rear cross member may be prevented from breaking through the support bracket to enhance lateral stiffness of a rear portion of a vehicle, to improve the ride and handling (R&H) performance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
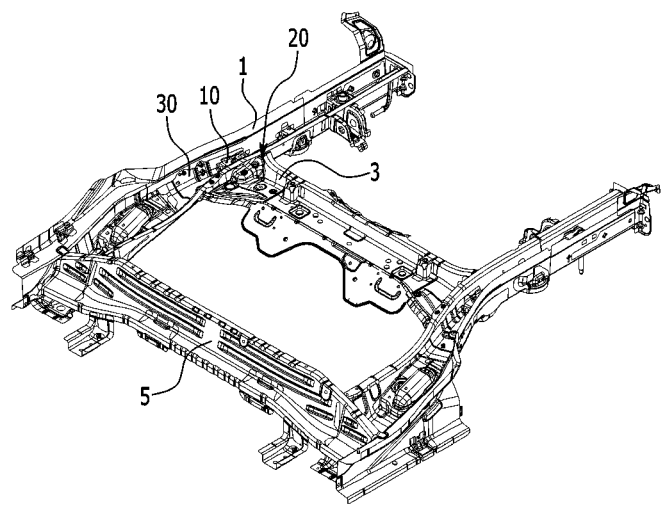
FIG. 1 is an exemplary schematic view of a vehicle body including a mounting unit for a rear suspension according to an exemplary embodiment of the present disclosure.

Exemplary embodiments of the present disclosure are described in detail so as for those of ordinary skill in the art to easily implement with reference to the accompanying drawings. However, the present disclosure may be implemented in various different forms and is not limited to these embodiments.

To clearly describe the present disclosure, a part without concerning to the description is omitted in the drawings, and like reference numerals in the specification denote like elements. Throughout the specification, although the terms first, second, etc. may be used herein to describe various elements, these elements should not be limited by these terms.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
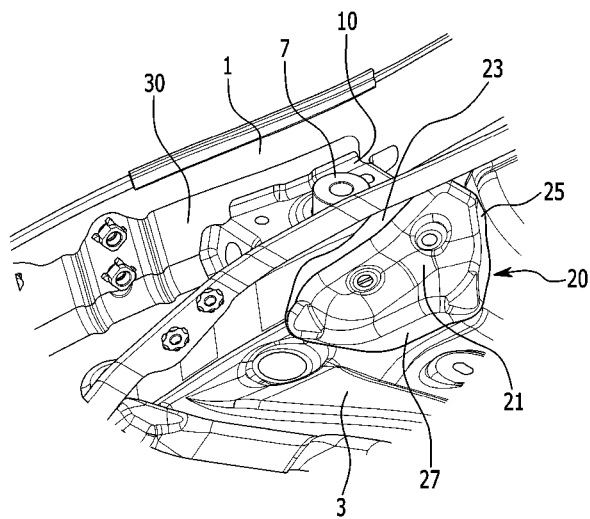
FIG. 2 is an exemplary detailed perspective view of a mounting unit for a rear suspension according to an exemplary embodiment of the present disclosure.
Figure 3:
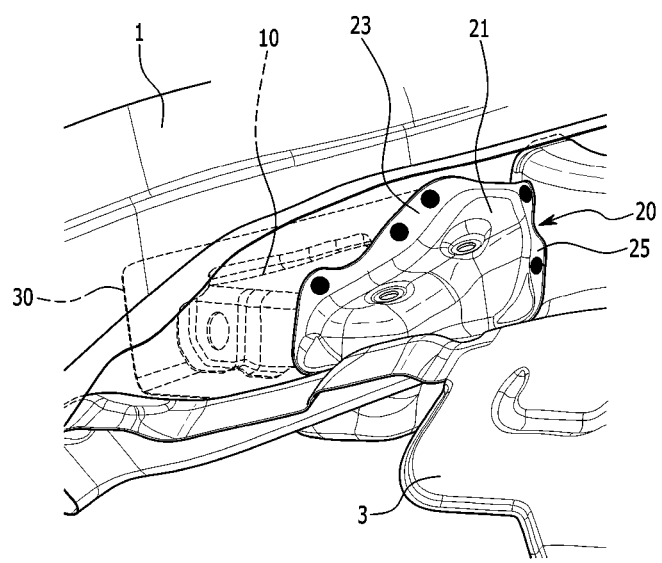
FIG. 3 is an exemplary perspective view of one side of a mounting unit for a rear suspension according to an exemplary embodiment of the present disclosure.
Figure 4:
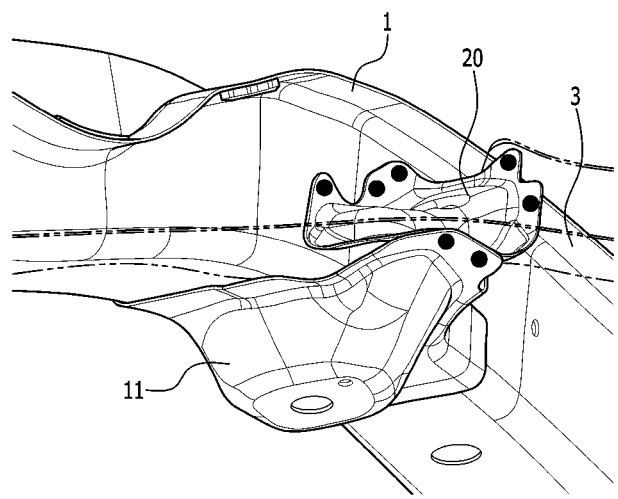
FIG. 4 is an exemplary perspective view of a bottom surface of a mounting unit for a rear suspension according to an exemplary embodiment of the present disclosure.
Figure 5:
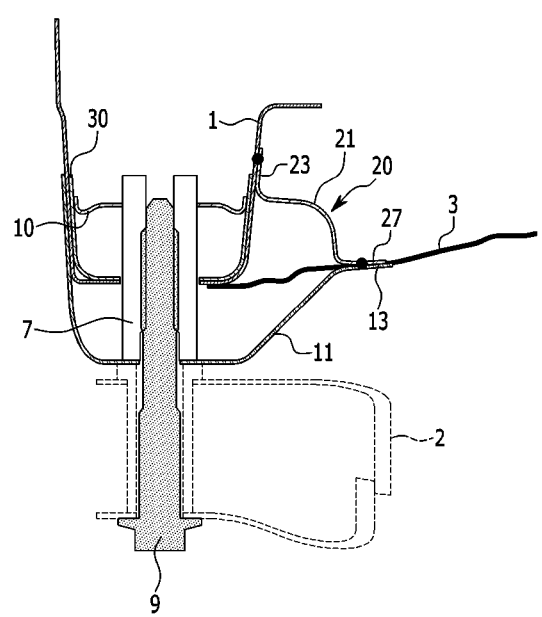
FIG. 5 is an exemplary schematic cross-sectional view of a vehicle body including a mounting unit for a rear suspension according to an exemplary embodiment of the present disclosure.

FIG. 1 is an exemplary schematic perspective view of a vehicle body including a mounting unit for a rear suspension according to an exemplary embodiment of the present disclosure. FIG. 2 is an exemplary detailed perspective view of a mounting unit for a rear suspension according to an exemplary embodiment of the present disclosure. FIG. 3 is an exemplary perspective view of one side of a mounting unit for a rear suspension according to an exemplary embodiment of the present disclosure. FIG. 4 is an exemplary perspective view of a bottom surface of a mounting unit for a rear suspension according to an exemplary embodiment of the present disclosure. FIG. 5 is an exemplary schematic cross-sectional view of a vehicle body including a mounting unit for a rear suspension according to an exemplary embodiment of the present disclosure.

Referring to FIG. 1, the mounting unit for a rear suspension (hereinafter, referred to as the mounting unit) according to an exemplary embodiment of the present disclosure may be applied to couple a rear suspension member 2 (refer to FIG. 5) of a vehicle to a rear floor side member 1. The mounting unit for a rear suspension may be applied to a multi link type suspension, the multi link type suspension may include a lower arm and a coil spring that are provided separately configured.

The multi link type suspension may include a wheel carrier configured to rotatably support a rear wheel, a lower arm disposed between a lower portion of the wheel carrier and a cross member in a vehicle width direction, a pair of upper arms disposed between an upper portion of the wheel carrier and the cross member in a vehicle width direction, a trailing arm disposed between a front lateral portion of the wheel carrier and a vehicle body in a vehicle body length direction, and a shock absorber and a coil spring that are disposed between the lower arm and the vehicle body in a vertical (e.g., an up and down) direction.

The multi link type suspension may include a shock absorber, a coil spring, and a lower arm to support the coil spring, as main components, coupled to each other to absorb vibration and impact continuously generated from a road while being displaced in a vertical direction due to the vibration and impact. In particular, although the mounting unit for a rear suspension according to an exemplary embodiment may be applied to a multi link type suspension, the present disclosure is not limited thereto and when necessary the mounting unit may be applied to other types of suspensions.

Referring to FIGS. 2 to 5, the mounting unit may include the pipe nut 7 disposed through one side of the rear floor side member 1. The mounting unit may include a first bracket 10 disposed in the rear floor side member 1 to be coupled to an upper end portion of the pipe nut 7. The first bracket 10 may be configured to bend to an open position in an inward direction to form a cavity between the first bracket 10 and the rear floor side member 1. The first bracket 10 may include a flange formed around a perimeter thereof to be coupled to the rear floor side member 10. The mounting unit may include a second bracket 11 disposed on the rear floor side member 1 and a rear cross member 3 while being coupled to a lower end portion of the pipe nut 7.

In particular, the second bracket 11 may have an intermediate portion formed to be convex in a downward direction while a first end portion may be coupled to the rear floor side member 1 and a second end portion may be coupled to the rear cross member 3. The second bracket 11 may include a welding flange 13 formed to be coupled to the rear cross member 3 with a support bracket 20 that will be described below.

The mounting unit may include a mounting bolt 9 coupled to the pipe nut 7 to maintain the position of one side of the rear suspension member 2 with respect to the rear floor side member 1. The mounting bolt 9 may be coupled to the pipe nut 7 through the rear floor side member 1 from bottom to top and may be coupled to the pipe nut 7 via a screw thread or press fit or the like. The mounting unit may include a support bracket 20 disposed between an exterior lateral surface of the rear floor side member 1 and the rear cross member 3. In particular, the support bracket 20 may be disposed between an exterior lateral surface of the rear floor side member 1 and a bottom surface of the rear cross member 3 to correspond to an end of each of the first bracket 10 and the second bracket 11 in an inward direction of a vehicle body.

In particular, the support bracket 20 will be described below in more detail. The support bracket 20 may include a body portion 21 having an intermediate portion formed to be convex. In other words, the body portion 21 may be formed to be convex toward an interior portion of a vehicle body to form a closed cavity portion between the rear floor side member 1 and the rear cross member 3. The closed cavity portion may strengthen stiffness between the rear floor side member 1 and the rear cross member 3.

Additionally, the body portion 21 may have an upper surface having a height that corresponds to a height of an upper surface of the first bracket 10. Accordingly, a load in an L direction of the body portion 21 and the first bracket 10 may be supported. The support bracket 20 may include a first flange 23 formed in a predetermined section of a perimeter of the body portion 21. The first flange 23 may be formed at a portion that contacts an exterior lateral surface of the rear floor side member 1. The first flange 23 may be coupled (e.g., welded) to the rear floor side member 1 with the first bracket 10.

The support bracket 20 may include a second flange 25 formed in a predetermined section of a perimeter of the body portion 21. The second flange 25 may be formed to be coupled to the first flange 23 and may be coupled to (e.g., welded on) an interior lateral surface of one side of the rear cross member 3. The support bracket 20 may include a third flange 27 formed in a predetermined section of a perimeter of the body portion 21. The third flange 27 may be formed at a portion that contacts a bottom surface of the rear cross member 3. The third flange 27 may be coupled to (e.g., welded on) the rear cross member 3 with the second bracket 11. In other words, the third flange 27 may be coupled (e.g., welded) at a portion of the second bracket 11, which is matched with a boundary line of the welding flange 13.

The mounting unit may include a reinforcement plate 30 interposed between the rear floor side member 1 and the first bracket 10. The reinforcement plate 30 may be shaped to correspond to a bottom surface and opposite interior lateral surfaces of the rear floor side member 1. The reinforcement plate 30 may be press-molded to be disposed to overlap with a predetermined section of an interior portion of the rear floor side member 1 in a length direction. The pipe nut 7 may be disposed through one side of the reinforcement plate 30.

Accordingly, the mounting unit for a rear suspension according to an exemplary embodiment may dispose the support bracket 20 between the rear floor side member 1 and the rear cross member 3 to improve structural stiffness. In other words, the resistance with respect to lateral deformation of the rear cross member 3 during vehicle cornering may be enhanced to improve safety. In particular, the mounting unit for a rear suspension may be configured to couple the support bracket 20 disposed between the rear floor side member 1 and the rear cross member 3 to the rear floor side member 1 and the rear cross member 3 with the first and second brackets 10 and 11 to enhance lateral stiffness of a vehicle, thereby preventing the rear cross member 3 from being deformed during vehicle cornering. Namely, the rear cross member may be prevented from fracturing due to enhance lateral stiffness of a rear portion of a vehicle and may improve ride and handling (R&H) performance.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

DESCRIPTION OF SYMBOLS

1: rear floor side member
2: rear suspension member
3: rear cross member
5: dash panel
7: pipe nut
9: mounting bolt
10: first bracket
11: second bracket
13: welding flange
20: support bracket
21: body portion
23: first flange
25: second flange
27: third flange
30: reinforcement plate

What is claimed is:

1. A mounting unit for a rear suspension of a multi link type for coupling a rear suspension member to a rear floor side member, comprising:
   a pipe nut disposed through one side of the rear floor side member;
   a first bracket and a second bracket configured to couple an upper end portion and a lower end portion of the pipe nut to the rear floor side member and a rear cross member, respectively;
   a mounting bolt coupled to the pipe nut to maintain a position of one side of the rear suspension member to the rear floor side member; and
   a support bracket coupled to the rear floor side member and the rear cross member with the first and second brackets through a flange integrally formed along a perimeter, while being disposed between an exterior lateral surface of the rear floor side member and a bottom surface of the rear cross member to correspond to an end of each of the first and second brackets in an inward direction of a vehicle body.

2. The mounting unit of claim 1, further comprising:
   a reinforcement plate having the pipe nut disposed therethrough while being interposed between the rear floor side member and the first bracket.

3. The mounting unit of claim 2, wherein the reinforcement plate is press-molded to overlap with a predetermined section of an interior portion of the rear floor side member in a length direction with a shape that corresponds to a bottom surface and opposite interior lateral surfaces of the rear floor side member.

4. The mounting unit of claim 1, wherein the support bracket includes:
   a body portion having an intermediate portion formed to be convex;
   a first flange coupled to the first bracket and formed along a predetermined section of a perimeter of the body portion and contacting an exterior lateral surface of the rear floor side member;
   a second flange formed along a predetermined section of a perimeter of the body portion and coupled to an interior lateral surface of one side of the rear cross member; and
   a third flange coupled to the second bracket and formed along a predetermined section of a perimeter of the body portion and contacting the bottom surface of the rear cross member.

5. The mounting unit of claim 4, wherein the support bracket includes a closed cavity portion formed between the body portion, the rear floor side member, and the rear cross member.

6. The mounting unit of claim 4, wherein the support bracket has an upper surface, a height of which corresponds to a height of an upper surface of the first bracket.

7. The mounting unit of claim 4, wherein the support bracket and the second bracket are coupled to opposite surfaces of the rear cross member, respectively, to match a boundary line between the body portion and the third flange of the support bracket with a boundary line of a flange coupled to the second bracket.

\* \* \* \* \*